(12) United States Patent
Swenson et al.

(10) Patent No.: US 11,962,178 B2
(45) Date of Patent: Apr. 16, 2024

(54) BATTERY MANAGEMENT FOR PERFORMING A FINAL ACTION

(71) Applicant: INTERNATIONAL BUSINESS MACHINES CORPORATION, Armonk, NY (US)

(72) Inventors: Eric B. Swenson, Pine Island, MN (US); Marc Henri Coq, Hopewell Junction, NY (US); Mark E. Maresh, Oro Valley, AZ (US); Richard John Fishbune, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 17/303,599

(22) Filed: Jun. 3, 2021

(65) Prior Publication Data

US 2022/0393493 A1 Dec. 8, 2022

(51) Int. Cl.
*H02J 7/00* (2006.01)
(52) U.S. Cl.
CPC .......... *H02J 7/0048* (2020.01); *H02J 7/0063* (2013.01)
(58) Field of Classification Search
CPC ......... H02J 7/0048; H02J 7/0063; H02J 7/005
See application file for complete search history.

(56) References Cited

U.S. PATENT DOCUMENTS

| 4,916,438 A | 4/1990 | Collins |
| 5,444,378 A | 8/1995 | Rogers |
| 6,469,512 B2 | 10/2002 | Singh |
| 9,851,410 B2 * | 12/2017 | Lee ...................... G01R 31/382 |
| 10,345,383 B2 * | 7/2019 | Mullen ................ G01R 31/382 |

(Continued)

FOREIGN PATENT DOCUMENTS

CN 110861531 A 3/2020

OTHER PUBLICATIONS

Leng et al., "Effect of Temperature on the Aging Rate of Li Ion Battery Operating above Room Temperature", https://www.nature.com/articles/srep12967, Aug. 6, 2015, Scientific Reports 5, Article No. 12967, pp. 1-37.

(Continued)

*Primary Examiner* — Nha T Nguyen
(74) *Attorney, Agent, or Firm* — Tihon Poltavets

(57) ABSTRACT

A method for managing a battery to perform a final action, the method includes determining a battery supplying power to an electronic device is discharging and receiving battery specification information for the battery. The method includes receiving environmental condition information for the battery and determining an open circuit voltage for the battery. The method includes determining a base capacity for the battery, a first capacity reduction for the battery based on the battery specification, and a second capacity reduction for the battery based on the environmental condition information. The method includes determining an overall expected capacity for the battery based on the first capacity reduction and the second capacity reduction, where the overall expected capacity represents available energy. Responsive to determining the available energy for the battery is less than a required energy to perform an action prior to battery depletion, the method includes sending a warning notification.

15 Claims, 5 Drawing Sheets

(56) References Cited

U.S. PATENT DOCUMENTS

| | | | |
|---|---|---|---|
| 10,677,852 B1* | 6/2020 | Wang | G01R 31/387 |
| 2004/0187134 A1* | 9/2004 | Suzuki | G06F 1/3203 |
| | | | 713/300 |
| 2005/0017685 A1 | 1/2005 | Rees | |
| 2014/0117945 A1* | 5/2014 | Verdun | H02J 5/00 |
| | | | 320/162 |
| 2016/0124053 A1 | 5/2016 | Akaishi | |
| 2016/0209226 A1* | 7/2016 | Nagy | G01C 21/3469 |
| 2016/0266979 A1* | 9/2016 | Glover | G01R 31/3646 |
| 2016/0331614 A1* | 11/2016 | Furman | A61G 7/005 |
| 2017/0369010 A1* | 12/2017 | Tarte | B60W 50/14 |
| 2018/0290552 A1 | 10/2018 | Chen | |
| 2018/0304836 A1 | 10/2018 | Decia | |
| 2019/0043270 A1* | 2/2019 | Hemes | G07C 5/004 |
| 2019/0132799 A1* | 5/2019 | Lippman | H02J 7/0013 |
| 2020/0135152 A1* | 4/2020 | Foster | G06F 1/28 |
| 2020/0298701 A1* | 9/2020 | Meier | F01N 3/2013 |
| 2021/0050631 A1* | 2/2021 | Li | H01M 10/446 |
| 2021/0111579 A1* | 4/2021 | Matsumura | H02J 7/0049 |
| 2023/0243600 A1* | 8/2023 | Lotfalian | F01K 25/10 |
| | | | 165/10 |
| 2023/0261206 A1* | 8/2023 | Zhang | H01M 50/581 |
| | | | 429/211 |

OTHER PUBLICATIONS

Mell et al., "The NIST Definition of Cloud Computing", National Institute of Standards and Technology, Special Publication 800-145, Sep. 2011, pp. 1-7.

* cited by examiner

BATTERY MANAGEMENT FOR PERFORMING A FINAL ACTION

BACKGROUND

This disclosure relates generally to battery management, and in particular to conserving battery energy to perform a final action prior to battery depletion.

Rechargeable batteries represent a type of electrical battery capable of being charged, discharged into a load, and subsequent recharged utilizing an external power source or electrical generator, such as an alternator. Rechargeable batteries are widely utilized in applications across industrial and consumer products in varying environmental conditions. As a battery ages and goes through numerous charge cycles, the battery experiences degradation, and an amount of charge the battery can maintain decreases. Furthermore, adverse environmental conditions can accelerate battery degradation and reduce an amount of charge a battery can maintain with each charge cycle.

SUMMARY

Embodiments in accordance with the present invention disclose a method, computer program product and computer system for managing a battery to perform a final action, the method, computer program product and computer system can, responsive to determining a battery supplying power to an electronic device associated with a user is discharging, receive battery specification information for the battery. The method, computer program product and computer system can receive environmental condition information for the battery. The method, computer program product and computer system can determine an open circuit voltage for the battery. The method, computer program product and computer system can determine a first capacity reduction for the battery based on the battery specification and a second capacity reduction for the battery based on the environmental condition information. The method, computer program product and computer system can determine an overall expected capacity for the battery based on a base capacity calculation with a first capacity reduction and a second capacity reduction, wherein the overall expected capacity represents available energy for the battery. The method, computer program product and computer system can, responsive to determining the available energy for the battery is less than a required energy to perform an action prior to battery depletion, send a warning notification to a client device associated with the user.

DETAILED DESCRIPTION

Embodiments of the present invention monitor a state of charge of a battery and responsive to the battery reaching a threshold charge level for performing a final action, providing a warning notification to a user, and implementing an energy conservation protocol. A battery monitoring program can receive battery specification information from the user or can source the battery specification information via a manufacturer's website that details the relevant information. The battery monitoring program can receive a manufacture date and an installation date for the battery, along with device information for the device utilizing the battery as a power source. The battery monitoring program can receive environmental information (e.g., ambient temperature, device temperature), where the environmental information includes current environmental condition data and predicted environmental condition data. The battery monitoring program can calculate a capacity reduction due to age of the battery, measure an open circuit voltage, and calculate a capacity reduction based on the environmental information. Subsequently, the battery monitoring program determines an overall expected battery capacity and determines whether a final action is performable with the overall expected battery capacity.

The battery monitoring program can utilize a capacity buffer in addition to an amount of required energy to perform the final action to determine if the overall battery capacity is enough to perform the final action. If the overall battery capacity is enough to perform the final action, the battery monitoring program reverts to receiving new environmental condition information and continues to monitor the discharging of the battery. If the overall battery capacity meets or falls below the capacity buffer and the amount of required energy to perform the final action, the battery monitoring program sends a warning notification to the user. In some embodiments, the battery monitoring program performs an energy conservation protocol (e.g., disabling one or more features and/or devices) to ensure the final action is performable with the overall expected battery capacity.

Figure 1:
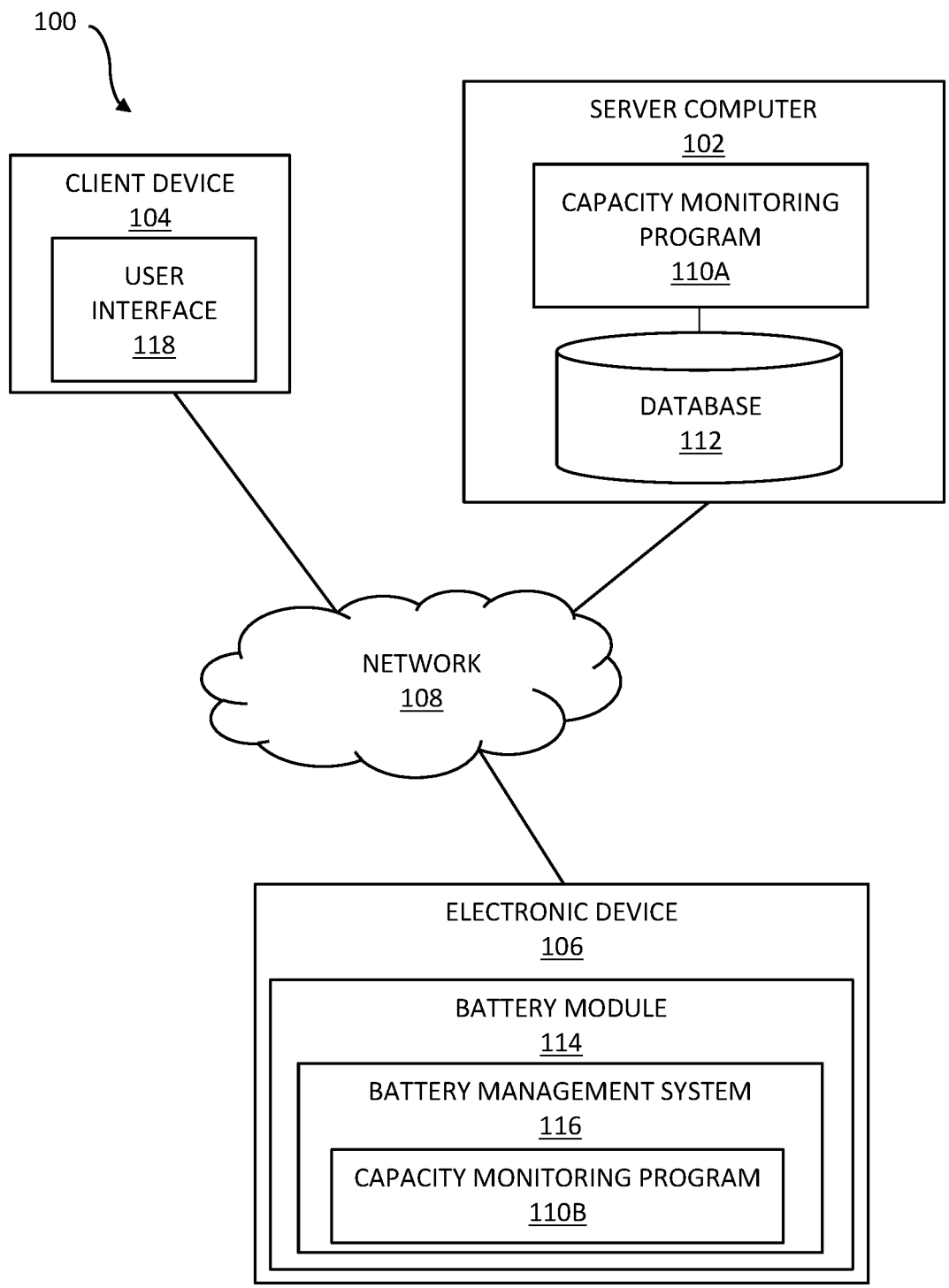
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102, client device 104, and electronic device 106 interconnected over network 108. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a smart phone, or any programmable electronic device capable of communicating with client device 104 and other computing devices (not shown) within the distributed data processing environment via network 108. In another embodiment, server computer 102 represents a computing system utilizing clustered computers and components (e.g., database server computers, application server computers, etc.) that act as a single pool of seamless resources when accessed within the distributed data processing environment. Server computer 102 includes client-side capacity monitoring program 110A and database 112. Server computer 102 may include internal and external hardware components, as depicted and described in further detail with respect to FIG. 3.

Client device 104 can be a laptop computer, a tablet computer, a smart phone, smart watch, a smart speaker, or any programmable electronic device capable of communicating with various components and devices within the distributed data processing environment, via network 108. Client device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 108. In one embodiment, client device 104 represents one or more devices associated with a user. Client device 104 includes an instance of user interface 118 for interacting with capacity monitoring program 110A on server computer 102 and/or capacity monitoring program 110B on electronic device 106.

Electronic device 106 represents a device that utilizes a rechargeable battery designated battery module 114. Battery module 114 has ability to be charged, discharged into a load, and recharged utilizing an external power source (e.g., solar panels) or electrical generator (e.g., alternator). Battery module 114 includes an instance of capacity monitoring program 110B operating on battery management system 116. Battery management system 116 represents an electronic system that manages battery module 114 by ensuring safe operational parameters are maintained, monitoring various operational states, determining secondary data, reporting the secondary data, controlling an internal environment (e.g., cooling fans), serial authentication, and load balancing across multiple cells of battery module 114. In one embodiment, an instance of capacity monitoring program 110B is integrated into battery management system 116, where capacity monitoring program 110B on battery module 114 communications with capacity monitoring program 110A operating on server computer 102. In another embodiments, battery management system 116 communications directly with capacity monitoring program 110A operating on server computer 102. Capacity monitoring program 110A performs the operational steps for managing battery module 114 discussed in further detail with regards to FIG. 2.

Network 108 can be, for example, a telecommunications network, a local area network (LAN), a wide area network (WAN), such as the Internet, or a combination of the three, and can include wired, wireless, or fiber optic connections. Network 108 can include one or more wired and/or wireless networks capable of receiving and transmitting data, voice, and/or video signals, including multimedia signals that include voice, data, and video information. In general, network 108 can be any combination of connections and protocols that will support communications between server computer 102, client device 104, electronic device 106, and other computing devices (not shown) within the distributed data processing environment.

Capacity monitoring program 110 manages battery module 114 during a discharge event to ensure battery module 114 maintains enough charge to perform a final action. Responsive to capacity monitoring program 110 determining battery module 114 is discharging, capacity monitoring program 110 receives battery module 114 specification information. Capacity monitoring program 110 receives electronic device 106 specification information since electronic device 106 is resulting in the discharging of battery module 114, where battery module 114 is integrated into electronic device 106 (as illustrated in FIG. 1) or at a location different from electronic device 106. Capacity monitoring program 110 receives environmental condition information for battery module 114, where the environmental conditions include current environmental condition data and predicated environmental condition data. Capacity monitoring program 110 determines a capacity reduction for battery module 114 based on age and the specification information and determines a current open circuit voltage for battery module 114. Capacity monitoring program 110 determines a capacity reduction for battery module 114 based on the received environmental conditions and determines an overall expected battery capacity for battery module 114. Capacity monitoring program 110 determines an amount of energy required for battery module 114 to perform a final action by electronic device 106.

In the event capacity monitoring program 110 determines an available charge is greater than a required amount of energy to perform the final action, capacity monitoring program 110 reverts to receiving updated environmental condition information and continues to monitor the discharging of battery module 114. In the event capacity monitoring program 110 determines an available is equal to or less than the required amount of energy to perform the final action, capacity monitoring program 110 determines whether a warning was sent to client device 104 associated electronic device 106. In the event the warning was not sent, capacity monitoring program 110 sends the warning to client device and performs an energy conservation protocol for electronic device 106 to reduce a discharge rate for electronic device 106 and/or instruct electronic device 106 to perform the final action. In the event capacity monitoring program 110 determines battery module 114 is not being charged, capacity monitoring program 110 reverts to receiving updated environmental condition information and continues to monitor the discharging of battery module 114. In the event capacity monitoring program 110 determines battery module 114 is being charged, capacity monitoring program 110 ceases monitoring battery module 114.

Database 112 is a repository that stores specification information for various types of batteries (e.g., battery module 114) and environmental condition information that includes current environmental condition data and predicated environmental condition data. Capacity monitoring program 110 can receive current environmental conditional data from one or more sensors (e.g., temperature sensor, humidity sensor) on electronic device 106 and/or a web-based service that can provide environmental condition information for battery module 114 based on a known location for electronic device 106. Capacity monitoring program 110 can receive predicted environmental conditional data from the web-based service based on the known location for electronic device 106 and an expected location if electronic device 106 is in transit. In the depicted embodiment, database 112 resides on server computer 102. In another embodiment, database 112 may reside on client device 104 or elsewhere within the distributed data processing environment provided capacity monitoring program 110 has access to database 112. A database is an organized collection of data. Database 112 can be implemented with any type of storage device capable of storing data and configuration files that can be accessed and utilized by capacity monitoring program 110, such as a database server, a hard disk drive, or a flash memory.

User interface 118 enables a user to make requests of or issue commands to client device 104 and receive information and instructions in response. In one embodiment, a user of client device 104 accesses user interface 118 via voice commands in natural language. In one embodiment, user interface 118 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 118 may also be mobile application software. In an example, mobile application software, or an "app," is a computer program designed to run on smart phones, tablet computers and other mobile devices. User interface 118 enables a user of client device 104 to interact with each instance of capacity monitoring program 110 and view various notifications sent by capacity monitoring program 110.

Figure 2:
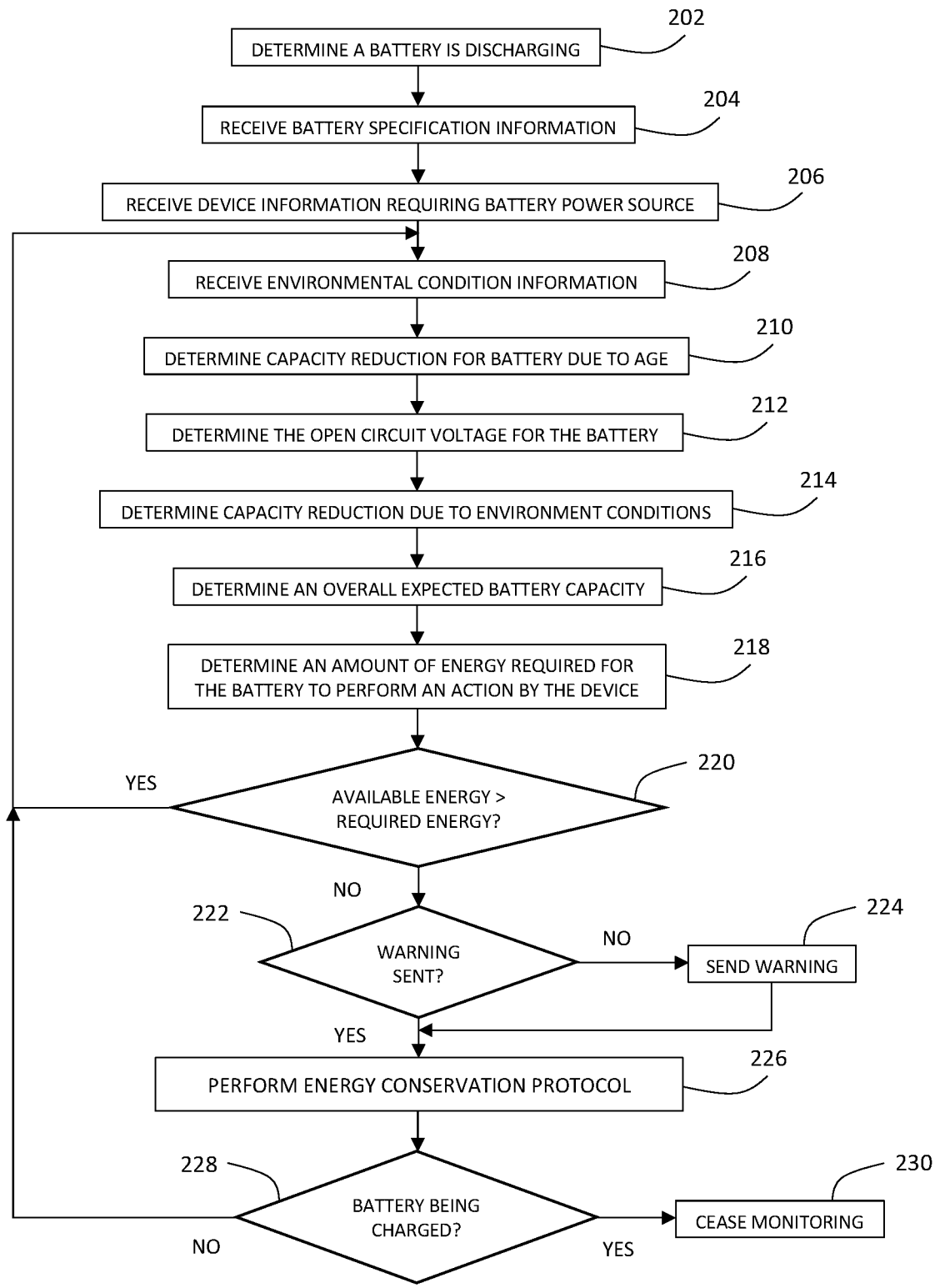
FIG. 2 is a flowchart depicting operational steps of a capacity monitoring program for managing a battery to ensure a final action is performable by an electronic device associated with the battery, in accordance with an embodiment of the present invention.

FIG. 2 is a flowchart depicting operational steps of a capacity monitoring program for managing a battery to ensure a final action is performable by an electronic device associated with the battery, in accordance with an embodiment of the present invention.

Capacity monitoring program 110 determines a battery is discharging (202). In this embodiment, the discharging battery is a rechargeable battery that is capable of being charged, discharged into a load, and subsequent recharged utilizing an external power source or electrical generator. In other embodiments, the discharging battery is a non-rechargeable battery (i.e., primary cell) capable of discharging a load and subsequently being recycled. The rechargeable battery powers an electronic device associated with a user, where capacity monitoring program 110 sends notifications to a client device (e.g., mobile device) associated with the user regarding the rechargeable battery. In one embodiment, a battery module is electrically coupled to a solar charger capable of charging the battery module. Capacity monitoring program 110 determines the battery module is discharging when a charge rate for the solar charger is below a battery usage rate for the battery module for a predetermined amount of time (e.g., an hour). In another embodiment, a battery is electrically coupled to an alternator capable of charging the battery when a vehicle is operational (i.e., engine running). Capacity monitoring program 110 determines the battery is discharging when the vehicle is no longer operational, and the alternator is no longer charging the vehicle. In yet another embodiment, capacity monitoring program 110 determines a battery is discharging for an electronic device (e.g., mobile phone, electric vehicle), when the electronic device is no longer connected to a power source (e.g., wall outlet, charging station).

Capacity monitoring program 110 receives battery specification information (204). The battery specification information includes various information and operational data for the discharging battery. The battery specification information can include but is not limited to manufacturer name, manufacturer series, maximum battery capacity at installation, installation date, battery life expectancy, manufacturer expected battery capacity degradation due to age, and manufacturer expected battery capacity degradation due to temperature. Capacity monitoring program 110 can source and retain battery specification information for every electronic device associated with the user that includes a rechargeable battery. Capacity monitoring program 110 can utilize an updatable database with battery specification information for common industrial based and/or consumer based electronic device. In the event capacity monitoring program 110 determines battery specification information is not present in the database, capacity monitoring program 110 queries the user through client device (e.g., mobile phone) to manually provide the battery specification information.

Capacity monitoring program 110 receives device information requiring a battery power source (206). The device information includes various information and operational data for the electronic device with the discharging battery. The device information can include but is not limited to manufacturer name, manufacturer series, battery life conservation modes, and manufacturer expected battery capacity due to temperature. The battery life conservation modes represent manufacturer defined settings for an electronic device to implement to conserve a remaining battery capacity. The manufacturer expected battery capacity due to temperature includes battery usage rates at different temperatures that the electronic device with the discharging battery can experience, since the device may draw more power in colder temperatures (e.g., $x<32°$ F.) or warmer temperatures (e.g., $x>85°$ F.). In one embodiment, where a battery module associated with a solar charger is discharging, capacity monitoring program 110 receives device information for one or more devices requiring the battery module as a power source. In a residential setting, the one or more devices can include various appliances (e.g., refrigerator, air conditioning units). In an industrial setting, the one or more devices can include air conditioning units and manufacturing equipment. In another embodiment, where a battery associated with a vehicle is discharging, capacity monitoring program 110 receives device information for the vehicle requiring the discharging battery to power any equipment (e.g., air conditioning, radio) on the vehicle. In yet another example, where a battery associated with an electronic device (e.g., mobile phone, electric vehicle) is no longer connected to a power source, capacity monitoring program 110 receives device information for the electronic device operating on the discharging battery.

Capacity monitoring program 110 receives environmental condition information (208). Capacity monitoring program 110 receives environmental condition information that includes current environmental condition data and expected environmental condition data. Current environmental condition data includes a current temperature value, a current humidity value, and ambient data (e.g., cloudy, raining, sunny) sourced from one or more sensors on the device with the discharging battery and/or a web-based service that provides the current temperature value and the current humidity value based on a known location of the device. Expected environmental condition data includes an expected temperature value and an expected humidity value within a predetermined time frame (e.g., an hour). The expected environmental condition data is sourced from the web-based service that provides the expected temperature value and the expected humidity values at an expected location for the device with the discharging battery. If the device is stationary (e.g., battery module associated with a solar charger), the expected location is the current location. If the device is mobile (e.g., a traveling electrical vehicle), the expected location is a destination location being traveled to at a conclusion of the predetermined time frame.

Capacity monitoring program 110 determines a capacity reduction for the battery due to age (210). Capacity monitoring program 110 determines a capacity reduction for the discharging battery based on a date of installation and battery specific information that includes the manufacturer expected battery capacity degradation due to age. For example, capacity monitoring program 110 determines a capacity reduction of 5% from new occurs for the battery at a first-year mark of operation and/or for a set amount of charge cycles (e.g., 400), a capacity reduction of 15% from new occurs for the battery at a second-year mark of operation and/or for a set amount of charge cycles (e.g., 800), and so on. Capacity monitoring program 110 utilizes the battery specific information to calculate a capacity reduction for the discharging battery based on the date of installation, as the battery degradation accelerates with age. Capacity monitoring program 110 determines the open circuit voltage for the battery (212). Capacity monitoring program 110 determines the open circuit voltage for the discharging battery for an instance where no external load is connected to the discharging battery.

Capacity monitoring program 110 determines a capacity reduction due to environment conditions (214). In this embodiment, capacity monitoring program 110 determines a capacity reduction for the discharging battery based on current environmental condition data and expected environmental condition data. As previously discussed, capacity monitoring program 110 receives current environmental condition data (e.g., current temperature value) for a current location of the discharging battery and based on the current temperature value, capacity monitoring program 110 utilizes manufacturer expected battery capacity degradation due to temperature from the received battery specification to determine the capacity reduction due to current environmental condition data. Furthermore, capacity monitoring program 110 can also receive expected environmental condition data (e.g., expected temperature value) for a current location of the discharging battery or a destination location at the conclusion of a predetermined time frame, if the discharging battery is mobile (e.g., electrical car). Capacity monitoring program 110 utilizes manufacturer expected battery capacity degradation due to temperature from the received battery specification to determine the capacity reduction due to expected environmental condition data. Capacity monitoring program 110 can calculate an average capacity reduction between the current environmental condition data and the expected environmental condition data or can calculate an average capacity reduction based on a prediction algorithm that considers an expected rate of temperature change between the current environmental condition data and the expected environmental condition data.

Capacity monitoring program 110 determines an overall expected battery capacity (216). Capacity monitoring program 110 determines the overall expected battery capacity based on the determined battery capacity reduction due to age and the determined battery capacity reduction due to environmental conditions. In one embodiment, capacity monitoring program 110 combines the battery capacity reduction values and apply an equal weight to each of the values to determine a combined capacity reduction value and the overall expected battery capacity. In another embodiment, capacity monitoring program 110 combines the battery capacity reduction values and applies a different weight to each of the values to determine a combined capacity reduction value and the overall expected battery capacity. For example, an older battery typically experiences a greater reduction in capacity in colder temperatures when compared to a newer battery. Capacity monitoring program 110 can apply a higher weight to an older battery versus a new battery for an identical temperature value. As a result, capacity monitoring program 110 determines an overall weighted expected battery capacity for the older battery is lower than an overall unweighted expected battery capacity for the older battery at the identical temperature value. Alternatively, capacity monitoring program 110 can utilize manufacture provided data for determining capacity reduction of a battery based on a combination of both age and temperature.

Capacity monitoring program 110 determines an amount of energy required for the battery to perform an action by the device (218). In this embodiment, the action is defined by the user of the device, where the action is performable by the device prior to depletion of the discharging battery. Capacity monitoring program 110 utilizes the determined overall expected battery capacity to ensure the action, also referred to as a final action, remains performable with the discharging battery. In one embodiment, a battery module is electrically coupled to a solar charger capable of charging the battery module. Capacity monitoring program 110 determines the battery module is discharging when a charge rate for the solar charger is below a battery usage rate for the battery module for a predetermined amount of time (e.g., an hour). Capacity monitoring program 110 determines an amount of energy required for the battery to perform an action by the device, where the action is to allow a laboratory refrigerator to remain operational for 8 hours prior to depletion of the battery module.

In another embodiment, a battery is electrically coupled to an alternator capable of charging the battery when a vehicle is operational (i.e., engine running). Capacity monitoring program 110 determines the battery is discharging when the vehicle is no longer operational, and the alternator is no longer charging the vehicle. Capacity monitoring program 110 determines an amount of energy required for the battery to perform a final action by the device, where the final action is to restart the vehicle prior to depletion of the battery on the vehicle. In yet another embodiment, capacity monitoring program 110 determines a battery is discharging for an electronic device (e.g., mobile phone, electric vehicle), when the electronic device is no longer connected to a power source (e.g., wall outlet, charging station). Capacity monitoring program 110 determines an amount of energy required for the battery to perform a final action (e.g., finish a video, reach a charging station) by the device.

Capacity monitoring program 110 determines whether an available energy for the battery is greater than a required energy for the battery to perform the action (decision 220). Capacity monitoring program 110 utilizes a capacity buffer for the battery capacity to ensure the available energy can perform the final action that requires a certain amount of energy, while being able to send a warning notification to a client device of the user prior to performing the final action. In the event capacity monitoring program 110 determines the available energy for the battery is equal to or less than the set threshold value above the required energy for the battery to perform the action ("no branch, decision 220), capacity monitoring program 110 determines whether a warning was sent to the user (decision 222). In the event capacity monitoring program 110 determines the available energy for the battery is greater than the required energy for the batter to perform the action ("yes" branch, decision 222), capacity monitoring program 110 reverts to receiving updated environmental condition information (208).

Capacity monitoring program 110 determines whether a warning was sent to the user (decision 222). In the event capacity monitoring program 110 determines a warning was not sent to the user ("no" branch, decision 222), capacity monitoring program 110 sends a warning to the user (224). In the event capacity monitoring program 110 determines a waring was previously sent to the user, capacity monitoring program 110 performs an energy conservation protocol (226).

Capacity monitoring program 110 sends a warning to the user (224). Capacity monitoring program 110 sends the warning notification to a client device associated with the user to inform the user the available energy for the battery will soon fall below the required energy for the battery to perform the final action by the device. In this embodiment, where the battery is rechargeable, the warning notification allows for the user to take preventative action to prevent the continued discharging of the battery, such as, connecting the device to a power source for recharging). Furthermore, the warning notification also allows for the user to take preventative action to decrease a discharge rate of the battery to ensure the available energy remains greater than the required energy for the battery to perform the final action by the device, such as, turning off battery depleting features and/or devices. In another embodiment, where the battery is non-rechargeable, capacity monitoring program 110 sends a warning notifications to the user to replace the battery, since the available energy for the battery will soon fall below the required energy for the battery to perform the final action by the device.

Capacity monitoring program 110 performs an energy conservation protocol (226). Capacity monitoring program 110 provides the user associated with the device experiencing the discharging battery an option for an energy conservation protocol, where the energy conservation protocol turns off battery depleting features and/or devices until the final action is performed. In one embodiment, where a battery module electrically coupled to a solar charger is discharging, capacity monitoring program 110 performs an energy conservation protocol that instructs a list of devices (e.g., computers, lights) previously specified by the user to power off. Capacity monitoring program 110, via a network connection, instructs the list of devices to power off until the battery module is being charged, to ensure the action of providing power to the laboratory refrigerator for 8 hours on the discharging battery is maintained.

In another embodiment, where a battery in vehicle is discharging, capacity monitoring program 110 performs an energy conservation protocol that instructs a first list of features to power off and instructs a second list of features to enter a low-energy consumption mode. Capacity monitoring program 110 can instruct the vehicle to disable the features such as, interior lights and air conditioning, to conserve the discharging battery. Capacity monitoring program 110 can also instruct the vehicle to enter a low-energy consumption mode, where the air conditioning is disable but a fan speed is set to a lowest setting and one or more windows on the vehicle are opened. Capacity monitoring program 110 performs the energy conservation protocol to ensure the draining battery maintains a minimum charge to perform a final action of starting the vehicle to charge the battery. In yet another embodiment, a battery is discharging for a mobile device where the user is watching a video, capacity monitoring program 110 performs an energy conservation protocol that instructs a first list of features to turn off (e.g., push notifications and application updates) and instructs a second list of features to enter a low-energy consumption mode (e.g., decreased display brightness). Capacity monitoring program 110 performs the energy conservation protocol to ensure the action of completing the video prior to the battery discharging. Another potential action would be for the user to instruct the vehicle to turn on, charging the battery.

Capacity monitoring program 110 determines whether the battery is being charged (decision 228). In the event capacity monitoring program 110 determines the battery is not being charged ("no" branch, decision 228), capacity monitoring program 110 reverts to receiving updated environmental condition information (208). In the event capacity monitoring program 110 determines the battery is being charged ("yes" branch, decision 228), capacity monitoring program 110 ceases monitoring the battery (230).

Figure 3:
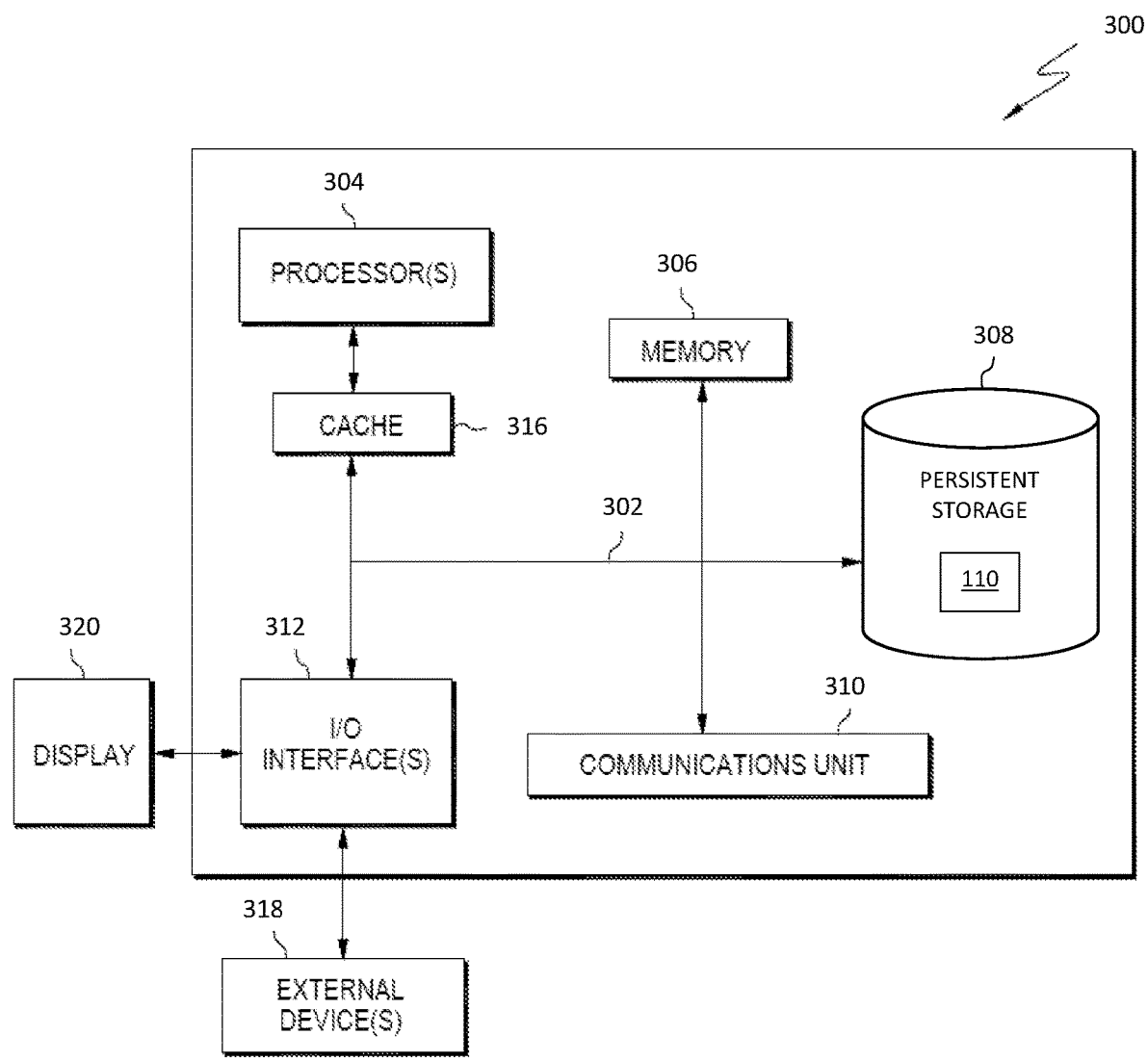
FIG. 3 is a block diagram of components of a computer system, such as the server computer of FIG. 1, in accordance with an embodiment of the present invention.

FIG. 3 depicts computer system 300, where server computer 102 is an example of a computer system 300 that includes capacity monitoring program 110. The computer system includes processors 304, cache 316, memory 306, persistent storage 308, communications unit 310, input/output (I/O) interface(s) 312 and communications fabric 302. Communications fabric 302 provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of processors 304 by holding recently accessed data, and data near recently accessed data, from memory 306.

Program instructions and data used to practice embodiments of the present invention may be stored in persistent storage 308 and in memory 306 for execution by one or more of the respective processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data used to practice embodiments of the present invention may be downloaded to persistent storage 308 through communications unit 310.

I/O interface(s) 312 allows for input and output of data with other devices that may be connected to each computer system. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
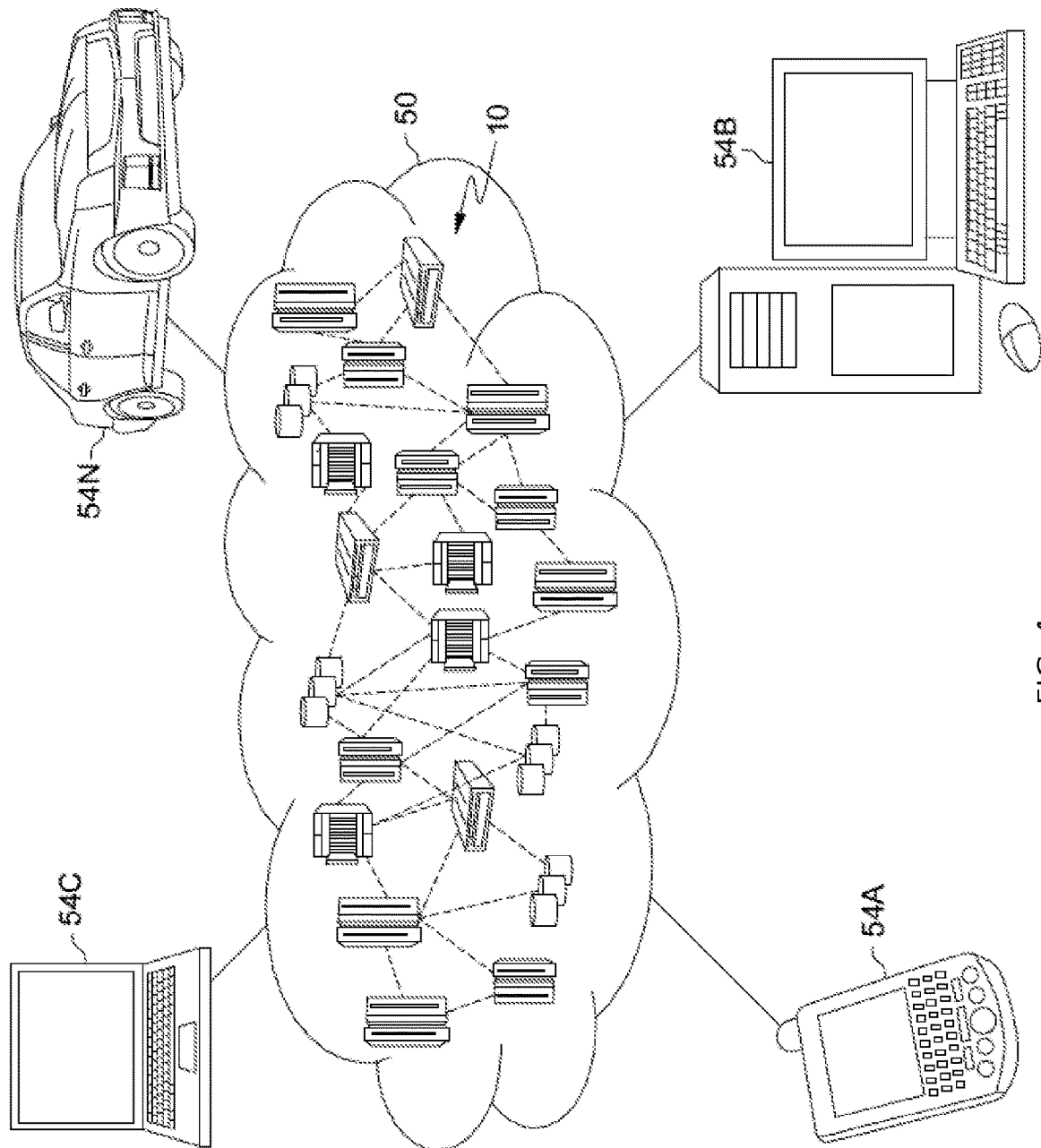
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
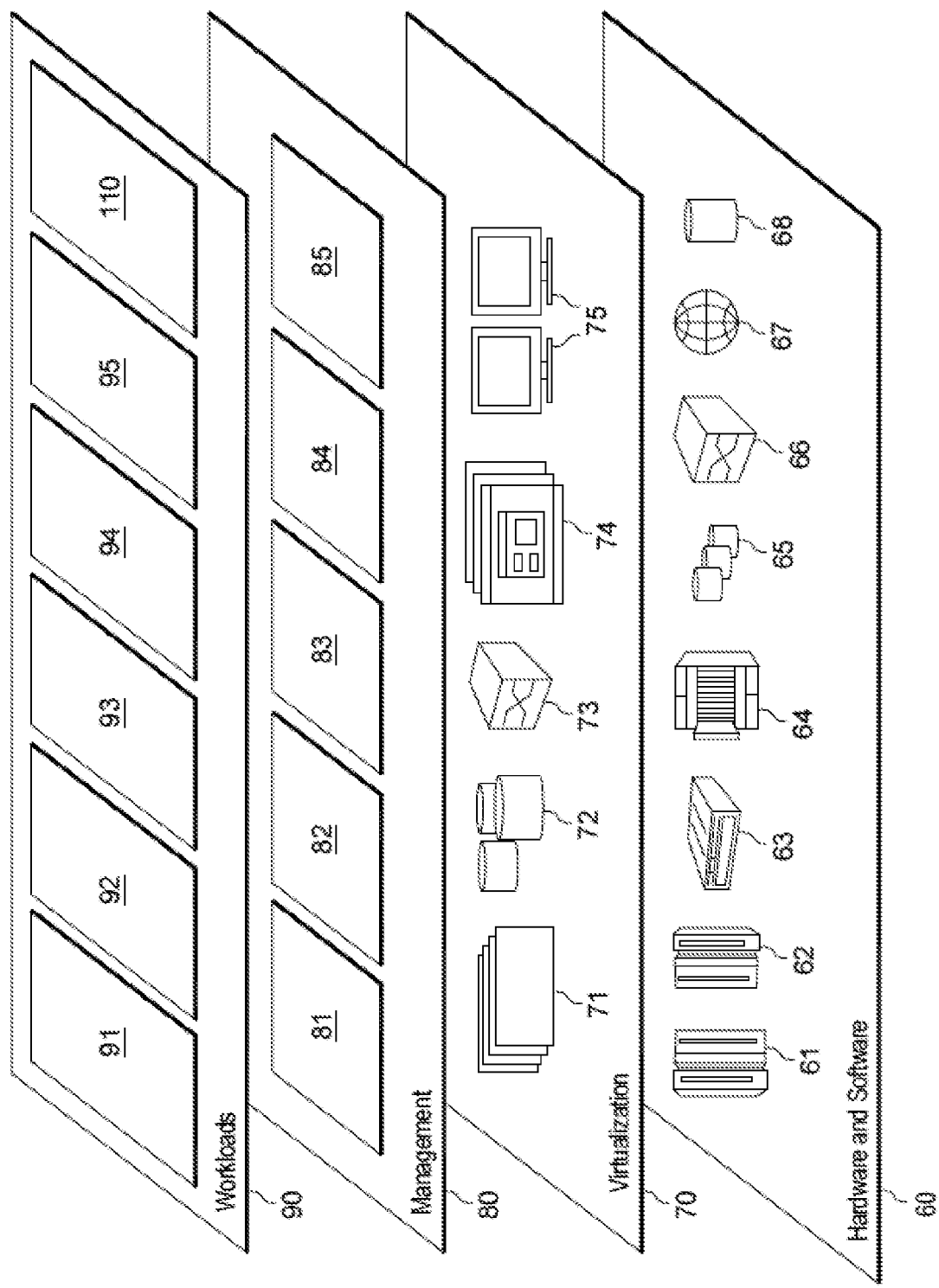
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and capacity monitoring program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   determining a battery supplying power to an electronic device associated with a user is discharging;
   receiving battery specification information for the battery;
   receiving environmental condition information for the battery;
   determining an open circuit voltage for the battery;
   determining a base capacity of the battery;
   determining a first capacity reduction for the battery based on the battery specification and the base capacity, and a second capacity reduction for the battery based on the environmental condition information;
   determining an overall expected capacity for the battery based on the first capacity reduction and the second capacity reduction, wherein the overall expected capacity represents available energy for the battery;
   determining the available energy for the battery is less than a capacity buffer and a required energy to perform a final action prior to battery depletion, wherein the capacity buffer ensures the available energy for the battery is enough to perform the final action prior to the battery depletion;
   sending a warning notification to a client device associated with the user; and
   instructing the electronic device to disable one or more features based on an energy conservation protocol, wherein the energy conservation protocol increases the available energy for the battery above the capacity buffer and the required energy to perform the final action prior to the battery depletion.

2. The computer-implemented method of claim 1, further comprising:
   receiving device information for the electronic device; and
   determining the required energy for the battery to perform the final action on the electronic device prior to the battery depletion based on the device information for the electronic device.

3. The computer-implemented method of claim 1, further comprising:
   instructing the electronic device to perform the final action prior to the battery depletion, wherein the electronic device has disabled the one or more features based on the energy conservation protocol.

4. The computer-implemented method of claim 1, wherein the environmental condition information includes current environmental condition data and expected environmental condition data.

5. The computer-implemented method of claim 4, wherein the current environmental condition data is for a first location of the battery and the expected environmental condition data is for a second location of the battery at a conclusion of a predetermined time frame.

6. A computer program product comprising one or more computer readable storage media and program instructions collectively stored on the one or more computer readable storage media, the stored program instructions executable by one or more computer processors, the stored program instructions comprising:
   program instructions to determine a battery supplying power to an electronic device associated with a user is discharging;
   program instructions to receive battery specification information for the battery;
   program instructions to receive environmental condition information for the battery;

program instructions to determine an open circuit voltage for the battery;
program instructions to determine a base capacity of the battery;
program instructions to determine a first capacity reduction for the battery based on the battery specification and the base capacity, and a second capacity reduction for the battery based on the environmental condition information;
program instructions to determine an overall expected capacity for the battery based on the first capacity reduction and the second capacity reduction, wherein the overall expected capacity represents available energy for the battery;
program instructions to determine the available energy for the battery is less than a capacity buffer and a required energy to perform a final action prior to battery depletion, wherein the capacity buffer ensures the available energy for the battery is enough to perform the final action prior to the battery depletion;
send a warning notification to a client device associated with the user; and
program instructions to instruct the electronic device to disable one or more features based on an energy conservation protocol, wherein the energy conservation protocol increases the available energy for the battery above the capacity buffer and the required energy to perform the final action prior to the battery depletion.

7. The computer program product of claim 6, the stored program instructions further comprising:
program instructions to receive device information for the electronic device; and
program instructions to determine the required energy for the battery to perform the final action on the electronic device prior to the battery depletion based on the device information for the electronic device.

8. The computer program product of claim 6, the stored program instructions further comprising:
program instructions to instruct the electronic device to perform the final action prior to the battery depletion, wherein the electronic device has disabled the one or more features based on the energy conservation protocol.

9. The computer program product of claim 6, wherein the environmental condition information includes current environmental condition data and expected environmental condition data.

10. The computer program product of claim 9, wherein the current environmental condition data is for a first location of the battery and the expected environmental condition data is for a second location of the battery at a conclusion of a predetermined time frame.

11. A computer system comprising:
one or more computer processors;
one or more computer readable storage media; and
program instructions stored on the computer readable storage media for execution by at least one of the one or more computer processors, the program instructions comprising:
program instructions to determine a battery supplying power to an electronic device associated with a user is discharging;
program instructions to receive battery specification information for the battery;
program instructions to receive environmental condition information for the battery;
program instructions to determine an open circuit voltage for the battery;
program instructions to determine a base capacity of the battery;
program instructions to determine a first capacity reduction for the battery based on the battery specification and the base capacity, and a second capacity reduction for the battery based on the environmental condition information;
program instructions to determine an overall expected capacity for the battery based on the first capacity reduction and the second capacity reduction, wherein the overall expected capacity represents available energy for the battery;
program instructions to determine the available energy for the battery is less than a capacity buffer and a required energy to perform a final action prior to battery depletion, wherein the capacity buffer ensures the available energy for the battery is enough to perform the final action prior to the battery depletion;
send a warning notification to a client device associated with the user; and
program instructions to instruct the electronic device to disable one or more features based on an energy conservation protocol, wherein the energy conservation protocol increases the available energy for the battery above the capacity buffer and the required energy to perform the final action prior to the battery depletion.

12. The computer system of claim 11, the stored program instructions further comprising:
program instructions to receive device information for the electronic device; and
program instructions to determine the required energy for the battery to perform the final action on the electronic device prior to the battery depletion based on the device information for the electronic device.

13. The computer system of claim 11, the stored program instructions further comprising:
program instructions to instruct the electronic device to perform the final action prior to the battery depletion, wherein the electronic device has disabled the one or more features based on the energy conservation protocol.

14. The computer system of claim 11, wherein the environmental condition information includes current environmental condition data and expected environmental condition data.

15. The computer system of claim 14, wherein the current environmental condition data is for a first location of the battery and the expected environmental condition data is for a second location of the battery at a conclusion of a predetermined time frame.

* * * * *